(12) United States Patent
Tan et al.

(10) Patent No.: US 10,141,685 B2
(45) Date of Patent: Nov. 27, 2018

(54) POWER CABLE TERMINAL

(71) Applicant: Tyco Electronics (Shanghai) Co. Ltd., Shanghai (CN)

(72) Inventors: Yuezhong Tan, Shanghai (CN); Xialin Shen, Shanghai (CN); Jianzhong Meng, Shanghai (CN); Lizhang Yang, Shanghai (CN)

(73) Assignee: Tyco Electronics (Shanghai) Co. Ltd., Shanghai (CN)

( * ) Notice: Subject to any disclaimer, the term of this patent is extended or adjusted under 35 U.S.C. 154(b) by 0 days.

(21) Appl. No.: 15/403,763

(22) Filed: Jan. 11, 2017

(65) Prior Publication Data

US 2017/0201040 A1 Jul. 13, 2017

(30) Foreign Application Priority Data

Jan. 11, 2016 (CN) .......................... 2016 1 0014819

(51) Int. Cl.
| | | |
|---|---|---|
| *H01R 13/58* | (2006.01) | |
| *H02G 15/064* | (2006.01) | |
| *H01R 13/53* | (2006.01) | |

(52) U.S. Cl.
CPC ......... *H01R 13/5845* (2013.01); *H01R 13/53* (2013.01); *H02G 15/064* (2013.01)

(58) Field of Classification Search
CPC .. H01R 13/5845; H01R 12/772; H01R 13/58; H01R 13/53; H01R 13/661; H02G 15/064
USPC ........ 439/445, 399, 401, 407, 449, 452, 474
See application file for complete search history.

(56) References Cited

U.S. PATENT DOCUMENTS

| | | | | | |
|---|---|---|---|---|---|
| 1,977,808 | A | * | 10/1934 | Salisbury ............... | H02G 15/06 174/20 |
| 3,187,175 | A | * | 6/1965 | Lang ........................ | H02B 1/50 174/150 |
| 3,417,187 | A | * | 12/1968 | Blumenfeld ............. | H05B 3/03 373/38 |
| 3,439,110 | A | * | 4/1969 | Lusk ..................... | H02G 15/013 174/19 |
| 3,548,070 | A | * | 12/1970 | Duenke ................ | H02G 15/068 174/12 BH |
| 3,652,975 | A | * | 3/1972 | Keto ...................... | H01H 9/085 174/152 R |
| 3,961,127 | A | * | 6/1976 | Gear, Jr. ................ | H02G 15/06 174/22 R |
| 5,466,891 | A | * | 11/1995 | Freeman ................ | H01B 17/28 174/11 BH |
| 5,816,835 | A | * | 10/1998 | Meszaros ........... | H01R 13/5221 439/205 |
| 2010/0200274 | A1 | * | 8/2010 | Jonsson .................. | B29C 70/58 174/137 B |
| 2013/0075124 | A1 | * | 3/2013 | Li ........................ | H02G 15/064 174/19 |

(Continued)

*Primary Examiner* — Harshad C Patel
(74) *Attorney, Agent, or Firm* — Barley Snyder

(57) ABSTRACT

A power cable terminal is disclosed. The power cable terminal comprises an insulation tube having a first end and an opposite second end, a stress control cone received in the insulation tube, a base connected to the first end of the insulation tube and having a cylinder extending into the insulation tube, and a connector. The connector presses an end face of the stress control cone against an end face of the cylinder and hermetically seals the stress control cone to the cylinder.

34 Claims, 4 Drawing Sheets

(56) References Cited

U.S. PATENT DOCUMENTS

2014/0076624 A1* 3/2014 Bohlin ................ H02G 15/046
174/40 R

* cited by examiner

POWER CABLE TERMINAL

CROSS-REFERENCE TO RELATED APPLICATION

This application claims the benefit of the filing date under 35 U.S.C. § 119(a)-(d) of Chinese Patent Application No. 201610014819.2, filed on Jan. 11, 2016.

FIELD OF THE INVENTION

The present invention relates to a terminal of a power cable.

BACKGROUND

High-voltage power cables are in high demand, and correspondingly, terminals for high-voltage power cables are widely used. In the prior art, power cable terminations typically include an insulation tube, a stress control cone and a base. The stress control cone is received in the insulation tube and adapted to be sleeved over a semiconductor layer of a power cable inserted into the insulation tube, so as to prevent local discharge on the power cable. The base is connected to the end of the insulation tube, and the stress control cone is connected to the base.

In the prior art, in order to improve the insulation effect, it is sometimes necessary to fill the insulation tube with an insulation oil. In this case, the stress control cone and the base are connected to each other by winding a tape around the peripheries of the stress control cone and the base. However, the tape is prone to aging, resulting in unreliable sealing, and the sealing operation of winding is very time-consuming, making installation inconvenient.

SUMMARY

An object of the invention, among others, is to provide a power cable terminal having a reliable and hermetically sealed connection between a stress control cone and a base of the terminal. The disclosed power cable terminal comprises an insulation tube having a first end and an opposite second end, a stress control cone received in the insulation tube, a base connected to the first end of the insulation tube and having a cylinder extending into the insulation tube and a connector. The connector presses an end face of the stress control cone against an end face of the cylinder and hermetically seals the stress control cone to the cylinder.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
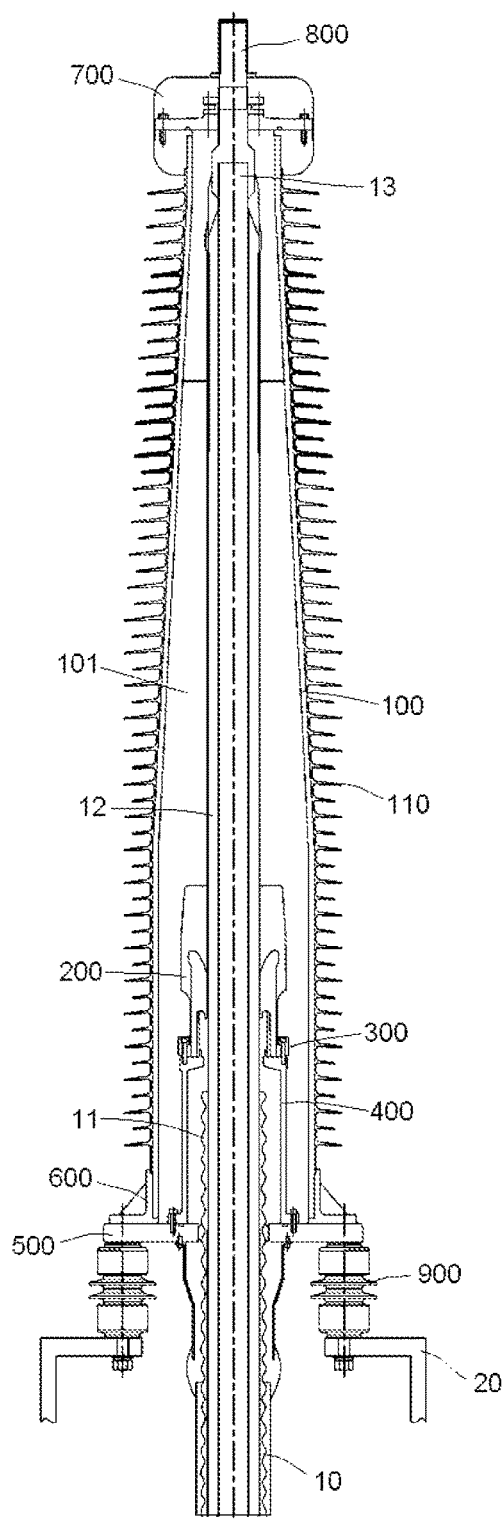
FIG. 1 is a sectional plan view of a power cable terminal according to the invention.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A power cable terminal according to the invention is shown generally in FIG. 1. The power cable terminal has an insulation tube 100, a stress control cone 200, a connector 300, and a base 400, 500, 600. The major components of the invention will now be described in greater detail.

The insulation tube 100, as shown in FIG. 1, has a first end (e.g., a bottom end, as shown in FIG. 1) and a second end (e.g., a top end, as shown in FIG. 1) opposite to the first end. The stress control cone 200 is received in the insulation tube 100. The base 400, 500, 600 is connected to the first end of the insulation tube 100 and has a cylinder 400 extending into the insulation tube 100. The connector 300 connects the stress control cone 200 to the cylinder 400 of the base 400, 500, 600.

Figure 2:
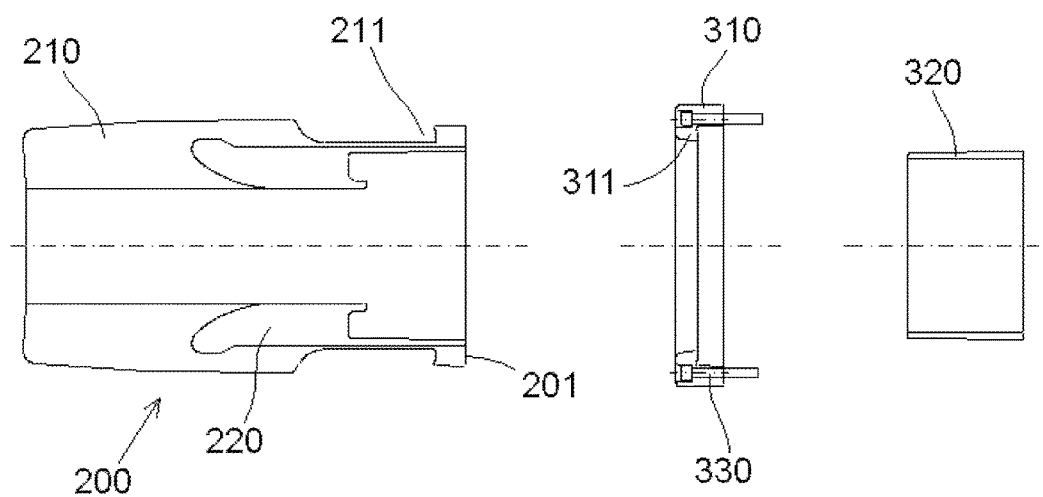
FIG. 2 is a sectional view of a stress control cone and a connector of the power cable terminal of FIG. 1.
Figure 3:
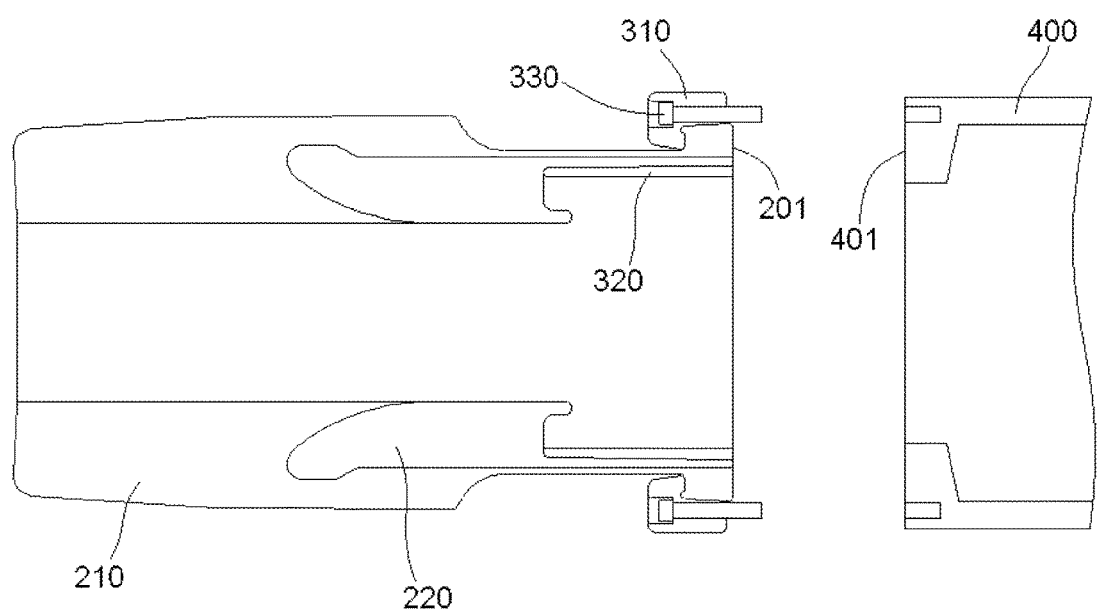
FIG. 3 is a sectional view of the stress control cone and the connector separated from a cylinder of a base of the power cable terminal of FIG. 1.
Figure 4:
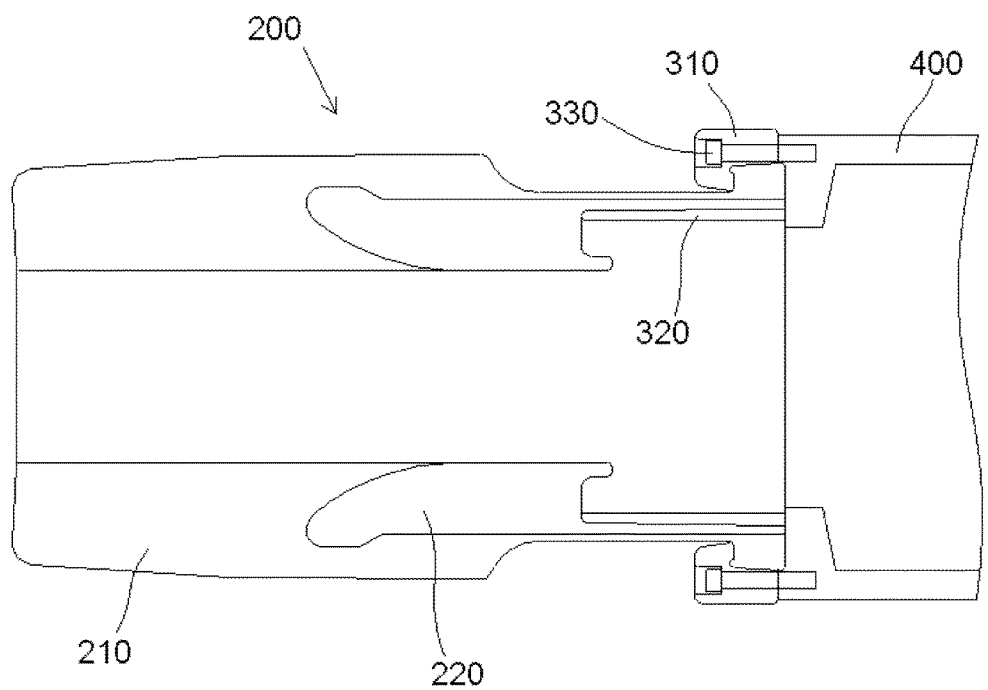
FIG. 4 is a sectional view of the stress control cone and the connector connected to the cylinder of the base.

The connector 300, as shown in FIGS. 2-4, has a connection flange 310, a support tube 320, and threaded fasteners 330.

The connection flange 310, as shown in FIGS. 2-4, is sleeved or fitted around an outer wall of an end of the stress control cone 200 located near the cylinder 400 and engaged to the stress control cone 200; a recess 211 is formed in the outer wall of the end of the stress control cone 200, the connection flange 310 has a protruding lip 311 protruding toward inside and adapted to be engaged in the recess 211.

The support tube 320, as shown in FIGS. 3 and 4, is provided inside the end of the stress control cone 200 so as to support an inner wall of the stress control cone 200.

The threaded fasteners 330 in the embodiments shown in FIGS. 3 and 4, may be screws or bolts. The connector 300 is adapted to tightly press an end face 201 of the stress control cone 200 against an end face 401 of the cylinder 400, so that the end face 201 of the stress control cone 200 is hermetically sealed to the end face 401 of the cylinder 400. The threaded fasteners 330 connect the stress control cone 200 and the cylinder 400 and pull them toward each other, so that the end face 201 of the stress control cone 200 is tightly pressed against the end face 401 of the cylinder 400. The connection flange 310 is connected to the cylinder 400 by means of the threaded fasteners 330, connecting the stress control cone 200 to the cylinder 400. Thereby, the connector 300 conveniently achieves a reliable and hermetic seals between the stress control cone 200 and the cylinder 400.

The base 400, 500, 600, as shown in FIG. 1, further includes a base plate 500 provided at an opening of the insulation tube 100 at the first end thereof and a flange 600 connected to the outer wall of the first end of the insulation tube 100. An end of the cylinder 400 distal from the stress control cone 200 is connected to the base plate 500, and the flange 600 is connected to the base plate 500.

The power cable 10, as shown in FIG. 1, includes a conductor core 13, an insulation layer wrapped around the conductor core 13, a semiconductor layer 12 wrapped around the insulation layer, and a shield sleeve layer 11 wrapped around the semiconductor layer 12.

The stress control cone 200, as shown in FIGS. 2-4, includes an insulation layer 210 and a semiconductor layer 220 provided inside the insulation layer 210. The stress control cone 200, as shown in FIG. 1, is configured to be sleeved around or fitted over the semiconductor layer 12 inserted through the opening of the first end of the insulation tube 100, so as to prevent local discharge on the power cable 10.

The power cable terminal, as shown in FIG. 1, further includes a connection bar 800 with one end inserted into the insulation tube 100 through an opening of the second end of the insulation tube 100 and the other end located outside the insulation tube 100, wherein the one end of the connection bar 800 inserted into the insulation tube 100 is adapted to be crimped on the conductor core 13 of the power cable 10 inserted into the insulation tube 100, so as to electrically connect to the conductor core 13 of the power cable 10.

The power cable terminal, as shown in FIG. 1, further includes a shielding cap 700 connected to the outer wall of the second end of the insulation tube 100 and sleeved around or fitted over the connection bar 800, so as to prevent local discharge on the connection bar 800.

The power cable terminal is adapted to be mounted on a support frame 20 as shown in FIG. 1, so as to overhead lay the power cable 10. The power cable terminal, as shown in FIG. 1, further includes a ceramic insulation gasket 900 provided between the base plate 500 and the support frame 20, so as to electrically isolate the power cable terminal from the support frame 20.

In the embodiment shown in FIG. 1, an insulation medium such as an insulation gas or an insulation liquid may be filled in a hollow interior space 101 of the insulation tube 100 shown in FIG. 1. Umbrella skirts 110 may also be formed on the outer wall of the insulation tube 100, so as to increase a creepage distance of the insulation tube 100.

Advantageously, in the power cable terminal according to the invention, the connector 300 is adapted to tightly press a lower end face 201 of the stress control cone 200 against an upper end face 401 of the cylinder 400, so that the lower end face 201 of the stress control cone 200 is hermetically sealed to the upper end face 401 of the cylinder 400. Thereby, the power cable terminal conveniently achieves a tight connection between the stress control cone 200 and the cylinder 400.

What is claimed is:

1. A power cable terminal, comprising:
   an insulation tube having a first end and an opposite second end;
   a stress control cone received in the insulation tube;
   a base connected to the first end of the insulation tube and having a cylinder extending into the insulation tube;
   a connector pressing an end face of the stress control cone against an end face of the cylinder and hermetically sealing the stress control cone to the cylinder;
   a connection bar having one end inserted into the insulation tube through an opening of the second end of the insulation tube and another end located outside the insulation tube; and
   a shielding cap connected to an outer wall of the second end of the insulation tube and sleeved around the connection bar.

2. The power cable terminal of claim 1, wherein the connector has threaded fasteners connecting the stress control cone and the cylinder.

3. The power cable terminal of claim 2, wherein the connector has a connection flange sleeved around an outer wall of an end of the stress control cone and engaged to the stress control cone.

4. The power cable terminal of claim 3, wherein the threaded fasteners connect the connecting flange to the cylinder.

5. The power cable terminal of claim 4, wherein the stress control cone has a recess formed in the outer wall of the end of the stress control cone.

6. The power cable terminal of claim 1, wherein the connector has a support tube disposed inside the end of the stress control cone and supporting an inner wall of the stress control cone.

7. The power cable terminal of claim 1, wherein the base has a base plate provided at an opening at the first end of the insulation tube and a flange connected to an outer wall of the first end of the insulation tube.

8. The power cable terminal of claim 7, wherein the flange and an end of the cylinder distal from the stress control cone are connected to the base plate.

9. The power cable terminal of claim 8, wherein the power cable terminal is mounted on a support frame.

10. The power cable terminal of claim 9, further comprising a ceramic insulation gasket disposed between the base plate and the support frame and electrically isolating the power cable terminal from the support frame.

11. The power cable terminal of claim 1, wherein the stress control cone has an insulation layer and a semiconductor layer disposed on an inner side of the insulation layer.

12. The power cable terminal of claim 11, wherein the stress control cone is sleeved around a semiconductor layer of a power cable inserted through an opening of the first end of the insulation tube.

13. The power cable terminal of claim 12, wherein the one end of the connection bar is crimped on a conductor core of the power cable.

14. The power cable terminal of claim 1, wherein an insulation medium is filled in an interior space of the insulation tube.

15. The power cable terminal of claim 14, wherein the insulation medium is an insulation gas or an insulation liquid.

16. The power cable terminal of claim 1, further comprising an umbrella skirt formed on an outer wall of the insulation tube.

17. A power cable terminal, comprising:
   an insulation tube having a first end and an opposite second end;
   a stress control cone:
      (a) in the insulation tube, and
      (b) having a recess in an outer wall of an end thereof;
   a base:
      (a) connected to the first end of the insulation tube, and
      (b) having a cylinder extending into the insulation tube; and a connector:
      (a) pressing an end face of the stress control cone against an end face of the cylinder of the base and hermetically sealing the stress control cone to the cylinder of the base,
      (b) having a connection flange sleeve around an outer wall of an end of the stress control cone and engaged to the stress control cone and having the connection flange has a protruding lip engaged in the recess, and (c) having threaded fasteners connecting the stress control cone and the cylinder of the base with the threaded fasteners connecting the connecting flange to the cylinder.

18. The power cable terminal of claim 17, wherein the connector has threaded fasteners connecting the stress control cone and the cylinder.

19. The power cable terminal of claim 18, wherein the connector has a connection flange sleeved around an outer wall of an end of the stress control cone and engaged to the stress control cone.

20. The power cable terminal of claim 19, wherein the threaded fasteners connect the connecting flange to the cylinder.

21. The power cable terminal of claim 20, wherein the stress control cone has a recess formed in the outer wall of the end of the stress control cone.

22. The power cable terminal of claim 17, wherein the connector has a support tube disposed inside the end of the stress control cone and supporting an inner wall of the stress control cone.

23. The power cable terminal of claim 17, wherein the base has a base plate provided at an opening at the first end of the insulation tube and a flange connected to an outer wall of the first end of the insulation tube.

24. The power cable terminal of claim 23, wherein the flange and an end of the cylinder distal from the stress control cone are connected to the base plate.

25. The power cable terminal of claim 24, wherein the power cable terminal is mounted on a support frame.

26. The power cable terminal of claim 25, further comprising a ceramic insulation gasket disposed between the base plate and the support frame and electrically isolating the power cable terminal from the support frame.

27. The power cable terminal of claim 17, wherein the stress control cone has an insulation layer and a semiconductor layer disposed on an inner side of the insulation layer.

28. The power cable terminal of claim 27, wherein the stress control cone is sleeved around a semiconductor layer of a power cable inserted through an opening of the first end of the insulation tube.

29. The power cable terminal of claim 28, further comprising a connection bar having one end inserted into the insulation tube through an opening of the second end of the insulation tube and another end located outside the insulation tube.

30. The power cable terminal of claim 29, wherein the one end of the connection bar is crimped on a conductor core of the power cable.

31. The power cable terminal of claim 30, further comprising a shielding cap connected to an outer wall of the second end of the insulation tube and sleeved around the connection bar.

32. The power cable terminal of claim 17, wherein an insulation medium is filled in an interior space of the insulation tube.

33. The power cable terminal of claim 32, wherein the insulation medium is an insulation gas or an insulation liquid.

34. The power cable terminal of claim 17, further comprising an umbrella skirt formed on an outer wall of the insulation tube.

* * * * *